United States Patent

[11] 3,624,241

[72] Inventor John L. Power
 Berea, Ohio
[21] Appl. No. 10,162
[22] Filed Feb. 10, 1970
[45] Patented Nov. 30, 1971
[73] Assignee The United States of America as represented by the Administrator of the National Aeronautics and Space Administration

[54] METHOD AND APPARATUS FOR CONTROLLING THERMAL NUCLEAR REACTORS
4 Claims, 3 Drawing Figs.

[52] U.S. Cl. ............................................. 176/86 L
[51] Int. Cl. ............................................. G21c 7/22
[50] Field of Search ................................. 176/86 L, 22

[56] References Cited
UNITED STATES PATENTS
3,365,367 1/1968 Dolle ............................ 176/86 L FOREIGN PATENTS
803,701 10/1958 Great Britain ............... 176/86 L Primary Examiner—Carl D. Quarforth
Assistant Examiner—Harvey E. Behrend
Attorneys—N. T. Musial, G. E. Shook and G. T. McCoy ABSTRACT: A power control system for a thermal nuclear reactor utilizes core tubes containing a solid sorbent, a thermal neutron absorbing material in ionic form, and a circulating aqueous solution. Control of the reactor is achieved by regulating the amount and distribution of the ionic poison retained by the solid sorbent in the core tubes. The amount of poison retained by the solid sorbent is regulated by controlling the chemical composition of the circulating solution. This regulation may be assisted by altering the chemical properties of the solid sorbent while the reactor is operating.

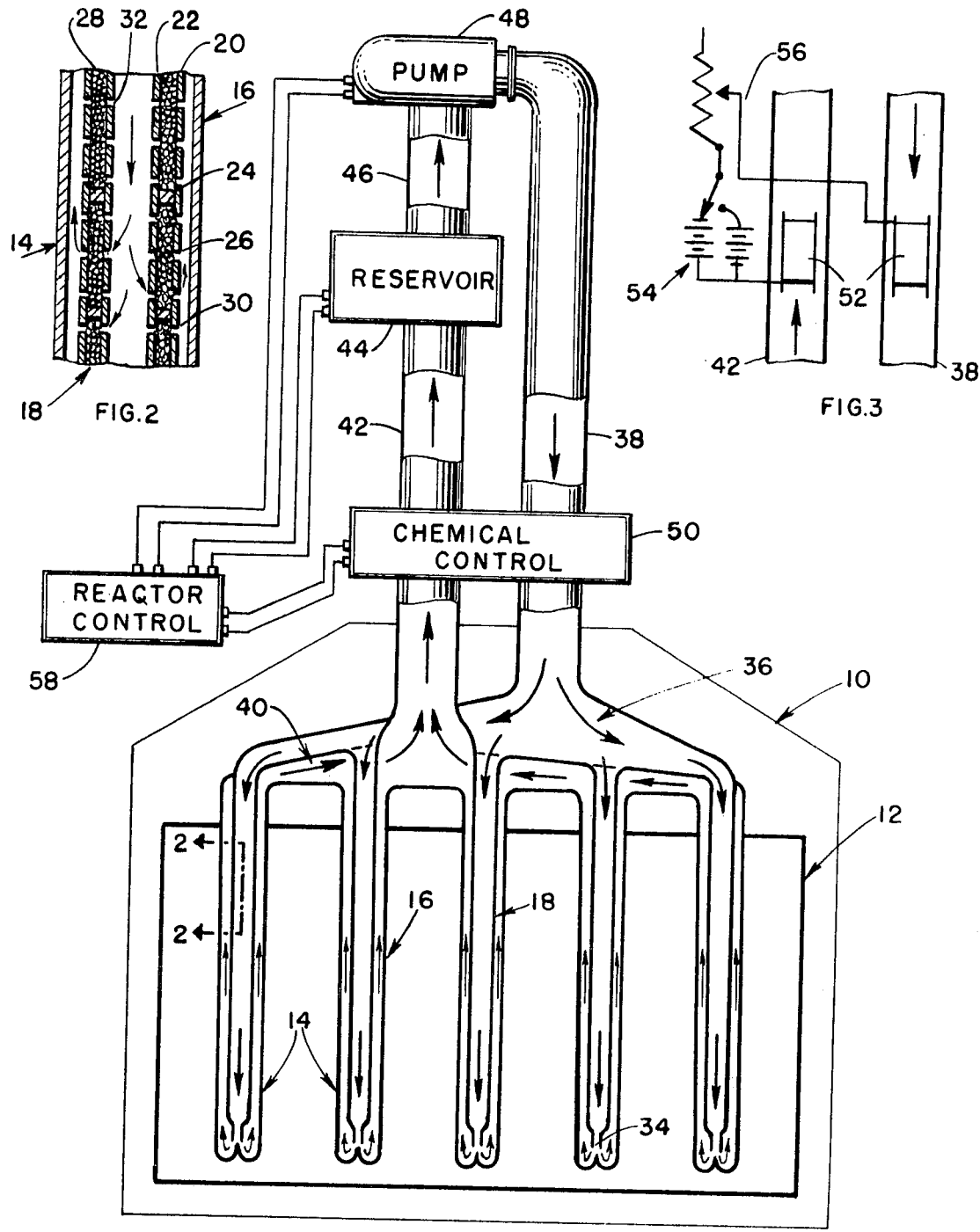

METHOD AND APPARATUS FOR CONTROLLING THERMAL NUCLEAR REACTORS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention is concerned with controlling thermal nuclear reactors. The invention is particularly directed to an improved chemical system for controlling a nuclear reactor in all normal operating modes, both static and dynamic.

Thermal nuclear reactors have relied for power control on solid neutron absorbers that are mechanically positioned. Such control systems require elaborate mechanisms for the precise positioning of the neutron absorbers and for the safe operation of the reactor using them.

Chemical control systems utilizing aqueous solutions have been proposed previously for use in thermal reactors. In these systems an aqueous solution containing the proper concentration of a neutron absorbing poison is circulated through the reactor moderator or reflector either in tubes or dissolved in the moderator fluid. Such systems have not been used for primary power control.

SUMMARY OF THE INVENTION

A chemical control system constructed in accordance with the invention regulates a nuclear reactor in both static and dynamic operating modes. That is, the control system not only maintains reactor operation in a given steady state condition, but also effects desired changes between steady state conditions. The system utilizes core tubes which extend through and are spaced throughout the reactor core volume. The core tubes contain a solid sorbent, such as an ion exchange material, and form a part of a closed liquid system having a circulating pump outside the reactor core. The control system utilizes a reservoir of neutron absorbing material in suitable ionic form. This reservoir is also situated outside of the reactor core.

Reactor start up and shut down are accomplished by transferring the ionic poison material between the reservoir and the ion exchange material in the core tubes. The reactor power level is also controlled in this manner. By controlling the chemical composition of the circulating solution, the amount of poison retained by the ion exchange material in the core tubes is regulated as desired. This results in accurate control of the reactor power level. Control of the amount of poison retained by the ion exchange material in the core tubes, and hence control of the reactor, may also be assisted by altering the chemical properties of the ion exchange material by electrochemical or thermal means.

OBJECTS OF THE INVENTION

It is, therefore, an important object of the present invention to provide neutron flux and reactor power control adjusted as desired and required throughout the reactor core and throughout reactor core life so as to optimize reactor operation and fuel utilization.

Another object of the invention is to provide a compact nuclear reactor control system which has few moving or mechanical parts.

Another object of the invention is to provide a fail-safe chemical control system having a minimum volume of solution, a minimum amount of poison material, and a negative temperature coefficient of reactivity.

A further object of the invention is to provide a reactor power control system of great accuracy and sensitivity, yet capable of very simple operation.

These and other objects of the invention will be apparent from the specification which follows and from the drawing wherein like numerals are used throughout to identify like parts.

DESCRIPTION OF THE DRAWINGS

FIG. 1 is a cross section view through the axis of a water moderated nuclear reactor having a control system constructed in accordance with the present invention;

FIG. 2 is an enlarged sectional view taken along the line 2—2 in FIG. 1; and

FIG. 3 is a partial view showing one embodiment of a chemical control subsystem constructed in accordance with the invention.

DESCRIPTION OF THE PREFERRED EMBODIMENT

Referring now to the drawing there is shown a portion of a water-moderated heterogeneous nuclear reactor 10 having a core 12 with a control system constructed in accordance with the present invention. By way of example, the nuclear reactor 10 may be of the type shown in U.S. Pat. No. 3,198,709.

This control system comprises a plurality of spaced tubes 14 which penetrate the reactor core 12 and are arranged in a regular array throughout the reactor core volume. Each core tube 14 has an outer cylindrical housing 16 which contains a liner 18 as shown in FIGS. 1 and 2. The liner 18 is formed by a pair of spaced concentric tubes 20 and 22. A plurality of impervious spacers 24 divide the annulus between the tubes 20 and 22 into separate annular compartments 26. The core tube components 16, 20, 22 and 24 are constructed of a suitable metal, such as Zircaloy-2.

Particles 28 of an ion exchange material, such as zirconium phosphate, are contained in the compartment 26. The amount of ion exchange material contained in each compartment is determined by the amount of thermal neutron absorption required in that volume of the reactor core for optimum reactor performance.

The liner tubes 20 and 22 are perforated as shown at 30 and 32 respectively, so as to contain the ion exchange particles 28 and yet form a flow-through, shell-type configuration which enables liquid to flow from inside the tube 22 through the annular compartments 26 to the annulus formed between the tube 20 and the housing 16. At the bottom of each liner 18 is an orifice 34. The thickness of the compartments 26, the number and distribution of the perforations 30 and 32, and the size of the orifice 34 in each tube 14 are chosen so as to optimize the liquid flow rate through each compartment 26 in order to achieve the maximum rate of equilibration between the circulating solution and the ion exchange material in the core tubes.

The circulating solution flows into each tube 22 of each core tube 14 from a supply plenum 36 having a minimum volume. The circulating solution flows into the plenum 36 from a supply pipe 38. The supply plenum 36 is so designed as to thoroughly mix the incoming solution and uniformly direct the liquid flow into the various core tubes.

The outflow end of the annulus between the outer housing 16 and the tube 20 of each core tube 14 opens into a discharge plenum 40 having a small volume. After the circulating solution passes from the supply plenum 36 through the core tubes 14 it is exhausted to the discharge plenum 40, which is so designed as to thoroughly mix the liquid entering it. The circulating solution then flows out of the discharge plenum 40 into an exhaust pipe 42 which is connected to and discharges the liquid flow into a reservoir 44.

The reservoir 44 contains an amount of the neutron absorbing poison sufficient to completely shut down the reactor under all conditions, both normal and emergency. The poison material is in ionic form and is preferably contained by ion exchange material in the same manner as in the core tubes 14. The ion exchange material, as in the core tubes 14, is kept in a fixed disposition within the reservoir 44, and is maintained in equilibrium with the circulating solution.

The reservoir 44 further has provisions to perform other necessary functions for the control system as they are required. More particularly, the reservoir 44 provides for the following: The removal of entrained and dissolved gases from the circulating solution; the removal of solid particles from the circulating solution; the intermittent addition of water or aqueous chemical solutions to the circulating solution as desired; the intermittent withdrawal, as desired, of a small fraction of the circulating solution; the pressurization of the entire control system with a suitable cover gas to an optimum operating pressure and the maintenance of this pressure.

From the reservoir 44 the circulating solution passes through a pipe 46 to the inlet of a continuously operated, high velocity circulating pump 48. The pumping speed may be either constant or variable. The pump 48 discharges the circulating solution directly into the supply pipe 38 and from there into the supply plenum 36, thereby completing the closed control system loop.

Both the supply pipe 38 and the exhaust pipe 42 are in communication with a chemical control subsystem 50. The purpose of this chemical control subsystem is to introduce temporary changes in the chemical composition of the circulating solution so as to properly regulate the amount of poison contained by the ion exchange material in the core tubes 14. This regulation comprises either maintaining or changing the amount of poison contained by the ion exchange material in the core tubes 14. By means of this regulation, the desired reactor power control is achieved.

The chemical control subsystem 50 may be operated in two different ways. A composition change may be introduced continuously into the circulating solution in the supply pipe 38 to affect the ion exchange material in the core tubes 14 with the composition change being neutralized continuously in the exhaust pipe 42. Alternatively, a composition change may be introduced continuously in the exhaust pipe 42 to affect the ion exchange material in the reservoir 44, with the composition change being neutralized continuously in the supply pipe 38.

Some reactor operations, such as rapid changes in the reactor power level, may require operation of the chemical control subsystem 50 in both of these operating modes simultaneously. In contrast, steady state reactor operation may not require any composition changes in the circulating solution. The temporary composition changes described are utilized both to maintain proper equilibrium conditions during the steady state reactor operation and to cause and control the necessary poison transfer required between the reservoir 44 and the tubes 14 in order to effect a desired change in the reactor power level.

Referring now to FIG. 3 there is shown apparatus which may be used as the chemical control subsystem 50 in FIG. 1. In this apparatus the required temporary composition changes in the circulating solution are accomplished by electrochemical reactions induced by electrodes 52 mounted in the supply pipe 38 and the exhaust pipe 42. These electrodes 52 are constructed of suitable materials for the desired electrochemical reactions, have a large surface area, and are electrically insulated from the walls of the pipes 38 and 42. The electrodes 52 are electrically connected through a suitable power supply, such as a reversible battery 54, and through a suitable current-voltage regulating device 56, which allows the current passed between the electrodes to be controlled as desired. The chemical control subsystem 50 in FIG. 1 may comprise more than one electrochemical system such as shown in FIG. 3.

Instead of the electrochemical system shown in FIG. 3, the chemical control subsystem 50 may consist of provisions for mechanically adding one chemical solution to the circulating solution in the supply pipe 38 and equivalent amounts of a neutralizing solution in the exhaust pipe 42. Alternatively the first solution may be added in the exhaust pipe 42 and the neutralizing solution in the supply pipe 38. The neutralizing solutions may, for example, consist of an acid and a base.

The chemical control subsystem 50 is also used to introduce gradual permanent changes in the chemical composition of the circulating solution. These permanent changes compensate for long term poison burn-up and chemical breakdown effects in the control system and for loss of core reactivity, all of which effects accompany extended operation of the reactor 10. The permanent composition changes are also accomplished electrochemically or by the mechanical addition of stored solutions.

The operations of the chemical subsystem 50 are controlled from a reactor control instrumentation console 58. Nonautomatic operations of the pump 48 and the reservoir 44 are also controlled from this console.

In the instrumentation console 58 or elsewhere in the reactor control instrumentation there are servosystems operated by signals from sensors monitoring the reactor power level and other critical reactor operating parameters. These servosystems automatically correct the control operations of the chemical control subsystem 50 so as to achieve or maintain the desired reactor operation.

The preferred chemical components of the circulating solution in the control system are as follows: gadolinium, samarium, europium, or cadmium, all in cationic form, as the soluble ionic poison; lithium–7 as an inert balancing cation; sulfate or nitrate as the solution anion; and a weak organic or inorganic acid as a pH-sensitive complexing agent for the ionic poison. As stated above the preferred ion exchange material is zirconium phosphate.

The control system contains provisions for adjusting the operating temperature of each segment of the control loop so as to optimize the control system operation. Such provisions may include variable external heating, variable external cooling, and controlled dissipation of the heat generated in or transmitted to the control system during reactor operation. The optimum operating temperatures in the control system may substantially exceed 100° C. The control system is maintained pressurized to such extent that at the highest allowable operating temperature there is no danger of boiling occurring in the circulating solution.

The control system may also include provisions for directly altering the chemical properties of the ion exchange material and the solution surrounding it. Such provisions may be utilized, separately or together, both in the core tubes 14 and in the reservoir 44. These provisions may include means for locally inducing electrochemical or thermal changes at or in the immediate vicinity of the ion exchange material. Through these effects the capacity or ion selectivity of the ion exchange material, or the distribution coefficients of the ions of interest on it, would be altered and controlled in such a manner as to assist in the optimum operation of the reactor control system.

I claim:

1. A method of controlling the power of a thermal nuclear reactor comprising the steps of
    placing predetermined amounts of a solid ion exchange sorbent exchange in predetermined fixed tubes forming an array in the core of said reactor,
    circulating an aqueous solution in a closed loop from outside said reactor core through said solid ion exchange sorbent,
    dissolving a thermal neutron absorbing material in ionic form in said aqueous solution, and
    regulating the amount of said thermal neutron absorbing material retained by said solid ion exchange sorbent by altering the chemical composition of said aqueous solution.

2. Apparatus for controlling a thermal nuclear reactor in both static and dynamic operating modes comprising a reactor core
    a plurality of spaced tubes extending through said reactor core,
    a solid ion exchange sorbent contained in a fixed position and distribution in each of said tubes,
    a closed loop operably connected to said tubes for circulating an aqueous solution containing thermal neutron absorbing material in ionic form through said solid ion exchange sorbent, and a reservoir of said thermal neutron absorbing material in said loop, loop means for controlling the amount of said thermal neutron absorbing material retained by said solid ion exchange sorbent to control the power level of said reactor.

3. Apparatus as claimed in claim 2 wherein said means includes means for controlling the chemical composition of said aqueous solution.

4. Apparatus as claimed in claim 3 wherein said means includes means for controlling the temperature of said aqueous solution.

* * * * *